Dec. 7, 1965  G. O. CAPEL  3,221,456

PANE SUPPORT AND SEAL

Filed May 27, 1960

INVENTOR
GILBERT OSWALD CAPEL

BY~ Fetherstonhaugh &Co.
ATTORNEYS

United States Patent Office 3,221,456
Patented Dec. 7, 1965

3,221,456
PANE SUPPORT AND SEAL
Gilbert O. Capel, Toronto, Ontario, Canada, assignor, by mesne assignments, to Dor-Seal Limited, Toronto, Ontario, Canada
Filed May 27, 1960, Ser. No. 32,326
2 Claims. (Cl. 52—400)

This invention relates to a moulding for retaining a glass window or the like within an opening in a door, wall or the like.

The customary manner of mounting a pane of glass in a door opening is to set it in putty between two wooden mouldings, one on each side of the glass, the mouldings themselves being held in place by means of nails, glue, etc.

This method of mounting glass in door entrances is relatively time consuming and therefore costly because the wooden mouldings must be carefully fitted. Further, in cases where the opening is of a curved nature, the shaping of the moulding is especially difficult to make and therefore costly. The mouldings are further not entirely leak proof.

This invention provides leak proof means for securing a sheet of glass or the like within a door opening that eliminates a great deal of the costly fitting and nailing operations of the prior art and that is especially suited to openings of a curved nature because no shaping or preforming of the moulding is necessary.

The moulding is one for supporting a glass window in an opening in a door or the like and comprises a body of resilient material in strip form. A first channel adapted to receive a sheet of glass therein extends longitudinally of the upper side of the moulding and a second channel adapted to embrace the marginal portions of a door opening extends longitudinally of the under side of the moulding. The first channel is, of course, substantially narrower than the second channel and the cross-sectional thickness between the bottom of the first channel and the bottom of the second channel is relatively small when compared to the thickness of the moulding on each side of first channel whereby to form a pair of substantially rigid jaws adapted to grip a glass section and to open and close about a jaw axis between the bottom of the first channel and the bottom of the second channel that extends longitudinally of the strip.

The invention will be clearly understood after reference to the following detailed specification read in conjunction with the drawings. In the drawings.

Figure 1:
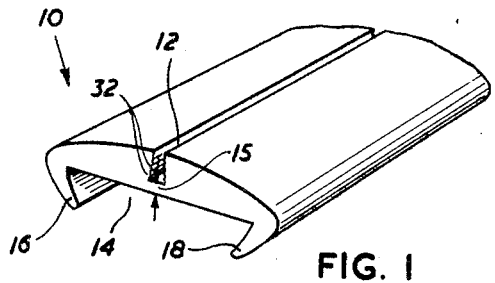
FIGURE 1 is a perspective view of a length of moulding.

Referring to the drawings, the numeral 10 generally refers to a window moulding according to this invention. It comprises a body of resilient material such as a vinyl plastic and is preferably manufactured by extrusion from a die according to well-known plastic manufacturing practice.

The moulding is of a substantially constant cross-section and is formed with a first channel 12 that extends longitudinally of its upper side and which is use is adapted to retain a sheet of glass and a second channel 14 extending longitudinally of its lower side whereby to form a pair of lips 16 and 18 which in use flex over and embrace the marginal portions of an opening in a door or the like.

The channel 12 is substantially narrower than channel 14 and the cross-sectional thickness indicated by the numeral 15 between the bottom of the channel 12 and the bottom of the channel 14 is relatively small while the cross-sectional thickness of the moulding from the channel to the edge of the moulding on each side of the channel 12 is relatively large whereby a pair of substantially rigid jaws 20 and 22 on each side of the channel 12 are formed which are adapted to grip the marginal edge portions of a piece of glass in use and which flex about an axis that extends longitudinally of the strip between the bottom of the channel 12 and the bottom of the channel 14.

In use as will be explained later the lips 16 and 18 must be flexed over the edge of an opening in a door or the like and for this purpose the material of the moulding must be flexible. On the other hand, it is desired that the jaws 20 and 22 be substantially rigid but free to open and close about an axis beneath the channel 12 in response pressure applied at the lips to engage with a glass sheet. A person skilled in the art would have no trouble in determining a plastic of suitable flexibility. It has been determined that a vinyl plastic having a durometer hardness of between 75 and 80 gives a good flexibility.

In order to fit a glass pane into a door opening one takes a length of moulding sufficient to extend around the edge of the glass 25, and inserts the marginal edges of the glass in the jaws 22 and 24.

Figure 2:
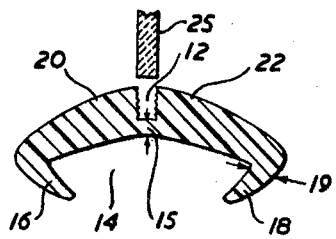
FIGURE 2 is a sectional view showing the moulding somewhat flexed to receive a piece of glass in the glass channel.
Figure 3:
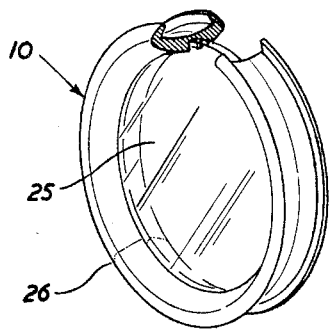
FIGURE 3 shows a round shaped piece of glass with moulding therearound.

As will be noted in FIGURE 1, channel 12 is preferably wider at its bottom than at its top and the glass 25 is slightly thicker than the width of the channel 12. Thus the jaws must be flexed open slightly to receive the glass as shown in FIGURE 2 and in FIGURE 3.

The free ends of the strip 10 are welded together by application of heat as at 26 by methods well-known in the plastic welding art to give a glass and moulding unit ready for insertion into an opening 28 in a door 30. It will be noted that the insertion of the glass has tended to open the jaws 22 and 24 and deflect the lips 16 and 18 inwardly and downwardly. The bottom of the channel 14 thus tends to have a V-shape.

Figure 4:
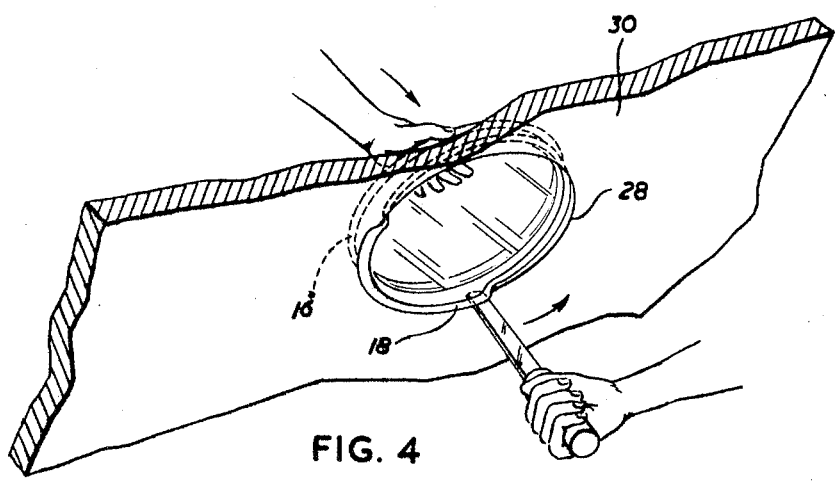
FIGURE 4 shows glass and moulding being inserted into an opening in a door.

The glass and moulding unit are then bodily inserted in the hole 28 as indicated in FIGURE 4 and a blunt tool is run around the underside of the hole to drag the lower lip 18 over the marginal portion of the opening on the underside of the door. As the tool is drawn completely around the opening, the lip will snap into position. At the same time the bottom of the channel 14 is somewhat straightened as the jaws are forced to grip the glass tighter.

It will be noted that the lips 16 and 18 are of substantial cross-sectional area adjacent their base as indicated by the cross-sectional thickness dimension 19. The thickness of the lips adjacent the base is relatively large when compared to the distance of 15 between the channels 12 and 14 so that when a laterally extending force is applied to the inside of the lips 16 and 18, it will tend to close the jaws 22 and 24 about the jaw axis which is, as indicated above, between the bottom of the channel 12 and the bottom of the channel 14.

In use, as the lips engage with the marginal area of a hole in a door, the marginal area of the hole in the door exerts an outward force thereon that tends to close the jaws about a piece of glass 25.

It will be noted that the channel 14 as viewed in FIGURE 1 is wider at its bottom than at its top. This insures a water-tight connection with the marginal edge of a door and tends to cause the door to exert a substantial lateral and outward force on the lips that closes the jaws about a piece of glass.

It will also be noted that the channel 12 is wider at its bottom than it is at its top. This is for the purpose of insuring that a good line seal is achieved with the glass at the top of the moulding. The sides of the glass channel 12 are also preferably formed with longitudinally extending ribs 32 for the purpose of securing a good glass seal.

I claim:

1. A moulding for supporting and sealing a window in an opening in a door or the like comprising a unitary strip of resilient material, said strip being of substantially constant cross section along its length, a first channel extending longitudinally of a first surface of said strip adapted to receive therein a sheet of glass, a second channel extending longitudinally of a second surface of said strip opposite from said first surface to form a pair of lips, said material being resilient as aforesaid whereby said lips can be flexed to embrace the marginal portions of an opening in a door or the like in use, said first channel being substantially narrower than said second channel, the thickness of the cross section between the bottom of said first channel and the bottom of said second channel of said strip being substantially smaller than the cross-sectional thickness of said strip on each side of said first channel from said first channel to the outer edge thereof, whereby to form a pair of substantially rigid glass-engaging jaws adapted to grip a glass section and open and close about a jaw axis lying in said substantially smaller cross-section between the bottom of said first channel and the bottom of said second channel, said jaw axis extending longitudinally of said strip, said cross-sectional thickness of said strip on each side of said first channel being substantially smaller than the distance from said first channel to the outer edge of said strip, said lips each extending towards each other to form said second channel wider at its bottom than at its open side opposite said bottom, and the cross sectional thickness of said strip at said lips being relatively large when compared to the cross-sectional thickness between the bottoms of said channels whereby laterally directed force transmitted to said lips by the marginal edge of an opening in a door or the like is transmitted to said glass engaging jaws to close them about said jaw axis.

2. A moulding as claimed in claim 1 in which said first channel is wider at its bottom than at its open side opposite said bottom.

References Cited by the Examiner
UNITED STATES PATENTS

| | | | |
|---|---|---|---|
| 2,255,725 | 9/1941 | Trescher | 20—56.4 |
| 2,532,130 | 11/1950 | Turner | 20—56.4 |
| 2,667,951 | 2/1954 | Gall | 189—78 |

REINALDO P. MACHADO, *Primary Examiner.*

GEORGE NINAS, JR., JEROME SCHNALL, CHARLES E. O'CONNELL, *Examiners.*